(12) United States Patent
Nijenhuis et al.

(10) Patent No.: US 6,835,799 B2
(45) Date of Patent: Dec. 28, 2004

(54) INTRINSICALLY GEL-FREE, RANDOMLY BRANCHED POLYAMIDE

(75) Inventors: Atze J. Nijenhuis, Sittard (NL); René Aberson, Amersfoort (NL); Boudewijn J. R. Scholtens, Sittard (NL)

(73) Assignee: DSM IP Assets B. V., Heerlen (NL)

( * ) Notice: Subject to any disclaimer, the term of this patent is extended or adjusted under 35 U.S.C. 154(b) by 0 days.

(21) Appl. No.: 09/882,298

(22) Filed: Jun. 18, 2001

(65) Prior Publication Data

US 2002/0022712 A1 Feb. 21, 2002

Related U.S. Application Data

(63) Continuation of application No. PCT/NL99/00764, filed on Dec. 13, 1999.

(30) Foreign Application Priority Data

Dec. 16, 1998 (NL) .............................................. 1010819

(51) Int. Cl.$^7$ .............................................. C08G 69/08
(52) U.S. Cl. ...................... 528/310; 528/170; 528/322; 528/323; 528/324; 528/328; 528/332; 528/335; 528/342; 428/357; 428/394; 428/395; 428/474.5
(58) Field of Search .................. 528/170, 310, 528/322–324, 328, 332, 335, 342, 340, 349; 428/357, 394, 395, 474.5

(56) References Cited

U.S. PATENT DOCUMENTS

| | | | | | |
|---|---|---|---|---|---|
| 4,268,661 A | * | 5/1981 | Schmid et al. | ............... | 528/338 |
| 4,277,433 A | * | 7/1981 | Schmid et al. | ........... | 264/289.3 |
| 5,177,178 A | * | 1/1993 | Thullen et al. | .......... | 528/339.3 |
| 5,769,163 A | * | 6/1998 | Fisch et al. | .................. | 528/310 |
| 5,859,148 A | * | 1/1999 | Borggreve et al. | .......... | 525/420 |
| 5,959,059 A | | 9/1999 | Vedula et al. | .................. | 528/76 |
| 6,051,312 A | * | 4/2000 | Arnauts et al. | ............. | 428/364 |
| 6,060,580 A | * | 5/2000 | Nijenhuis et al. | ........... | 528/332 |
| 6,288,208 B1 | * | 9/2001 | Moshinsky | ................. | 528/332 |

FOREIGN PATENT DOCUMENTS

EP 345648 * 6/1989

* cited by examiner

*Primary Examiner*—P. Hampton Higtower
(74) *Attorney, Agent, or Firm*—Mayer, Brown, Rowe & Maw LLP

(57) ABSTRACT

The invention relates to a randomly branched polyamide comprising at least units derived from:
1. AB monomers,
2. at least one compound I, being a carboxylic acid ($A_v$) having a functionality $v \geq 2$ or an amine ($B_w$) having a functionality $w \geq 2$,
3. at least one compound II, being a carboxylic acid ($A_v$) having a functionality $v \geq 3$ or an amine ($B_w$) having a functionality $w \geq 3$, compound II being a carboxylic acid if compound I is an amine or compound II being an amine if compound I is a carboxylic acid and the amounts of all units derived from carboxylic acids and amines in the polyamide satisfying conditions as mentioned in claim 1.

The composition of the randomly branched polyamide is such that it cannot form a crosslinked polyamide (and thus no gels, either), in particular during the prepolymerization, the polymerization, the post-condensation, the processing and the storage of the randomly branched polyamide, and this at a variety of ambient factors, for instance at elevated temperature and pressure. The polyamide is eminently suitable for the production of fiber and film, in particular for flat film.

26 Claims, 9 Drawing Sheets

■ : linear polyamide ; ○ : branched polyamide according to the invention.

SVK : melt drawing force
SVV : melt drawing degree

INTRINSICALLY GEL-FREE, RANDOMLY BRANCHED POLYAMIDE

CROSS REFERENCE TO RELATED APPLICATION

This application is a continuation under 35 U.S.C. § 120 of International Application PCT/NL99/00764 filed Dec. 13, 1999 which designated the U.S., and that International Application was published under PCT Article 21(2) in English.

The invention relates to a randomly branched polyamide comprising at least units derived from:
1. AB monomers,
2. at least one compound I, being a carboxylic acid ($A_v$) having a functionality $v \geq 2$ or an amine ($B_w$) having a functionality $w \geq 2$,
3. at least one compound II, being a carboxylic acid ($A_v$) having a functionality $v \geq 3$ or an amine ($B_w$) having a functionality $w \geq 3$, compound II being a carboxylic acid if compound I is an amine or compound II being an amine if compound I is a carboxylic acid.

In the context of this application, with the term "randomly branched" is meant that the branching points are randomly distributed in the polyamide chain.

Such a randomly branched polyamide is known from EP-345.648-B1. However, a problem encountered with the randomly branched polyamide according to EP-345.648-B1 is that the randomly branched polyamide is not intrinsically gel-free so that, while the randomly branched polyamide can for instance be obtained as a gel-free melt, during further processing of the randomly branched polyamide, gel formation may as yet occur. In the context of this application gel formation is understood to be a process involving the formation of a network in a polymer material. Gel formation gives rise to, among other things, the formation of visible inhomogeneities ("gels") during processing of the randomly branched polyamide into, for instance, films or fibres and to deterioration of the mechanical properties of polyamide objects obtained from the randomly branched polyamide. It is also known that when randomly branched polyamide is processed in equipment where local overheating may take place or where polyamide material may accumulate, for instance in extruders and mixers, it may contain strongly crosslinked polyamide.

It is desirable to have intrinsically gel-free randomly branched polyamide available. In the context of this application "intrinsically gel-free" is understood to mean that the composition of the randomly branched polyamide is such that it cannot form crosslinked polyamide (and therefore no gels), in particular during the prepolymerization, the polymerization, the post-condensation, the processing, for instance into films or fibres, and the storage of the randomly branched polyamide, and this at a variety of ambient factors, for instance at elevated temperature and pressure.

Although the prevention of gel formation in polymeric materials has been receiving a great deal of attention in practice, at this point of time neither a structural nor a systematic approach is known to provide an adequate solution to the problem of obtaining intrinsically gel-free, randomly branched polyamide from AB monomers.

It is the aim of the inventors to provide such an intrinsically gel-free, randomly branched polyamide comprising at least units derived from:
1. AB monomers,
2. at least one compound I, being a carboxylic acid ($A_v$) having a functionality $v \geq 2$ or an amine ($B_w$) having a functionality $w \geq 2$,
3. at least one compound II, being a carboxylic acid ($A_v$) having a functionality $v \geq 3$ or an amine ($B_w$) having a functionality $w \geq 3$, compound II being a carboxylic acid if compound I is an amine or compound II being an amine if compound I is a carboxylic acid.

This aim is achieved when the amounts of all units derived from carboxylic acids and amines in the polyamide satisfy formula 1

$$P > 1/[(F_A-1).(F_a-1)] \quad (1)$$

where:

$$P = [\Sigma(n_i f_i)]_x / [\Sigma(n_i f_i)]_y \quad (2)$$

where $P \geq 1$ and either X=A and Y=B, or X=B and Y=A, and $$F_x = \Sigma(n_i f_i^2) / \Sigma(n_i f_i) \quad (3)$$

for, respectively, all carboxylic acids (X=A) and all amines (X=B), where $f_i$ is the functionality of either the carboxylic acid ($f_i = v_i$) or amine ($f_i = w_i$), $n_i$ being the number of moles of the carboxylic acid or amine and the summation involving all units derived from carboxylic acids and amines in the polyamide.

In the context of the present invention AB monomer is understood to be a monomer that has both a carboxylic acid group (A) and an amino group (B).

In the context of the present application compound I and compound II are also understood to be mixtures of several carboxylic acids having the same functionality or mixtures of several amines having the same functionality.

In the context of the present application carboxylic acid and amine are understood to be, respectively, a compound which, besides one or more carboxylic acid groups, does not carry any amine groups and the other way round. It therefore follows that units derived from carboxylic acids or amines in the polymer have a chemical composition that differs from chat of the units derived from the AB monomers. Carboxylic acid group is in the context of the present application understood to be a group that can form a covalent bond with an amine group, for instance —COOH, —COHal (Hal=halogen), —CO$_2$R in which R is an alkyl residue with 1 to 20 carbon atoms and —SO$_2$Hal (Hal=halogen).

In the context of the present application functionality is understood to be the number of functional groups in the carboxylic acid or the amine that can form a bond with other carboxylic acids, amines or AB monomers to form the randomly branched polyamide according to the invention A functional group that cannot form this bond, for instance a sterically hindered amine group or an aromatic amine group, is not considered as a functional group in determining the functionality. Likewise, the functionality is equated to 1 if two functional groups at a compound are both involved in a single bond with a third functional group, for instance two COOH groups that are close together which form an imide bond with an amine, for instance in the compound orthodicarboxy-benzene.

Preferably, the functionality v or w of compound I can be chosen from 2, 3, 4, 5 and 6. More preferably, the functionality of compound I is 2. Preferably, the functionality v or w of compound II can be chosen from 3, 4, 5 and 6, more preferably, the functionality of compound II is 3.

Eligible AB monomers are all AB monomers that can be used for the production of polyamides, in particular α,ω-amino acids and/or lactams, for instance caprolactam, laurine lactam and dodecalactam, as well as the corresponding amino acids and aromatic amino acids, for instance p-(aminomethyl)-benzoic acid. Preferably, the lactam is ε-caprolactam.

Eligible carboxylic acids ($A_v$) are preferably difunctional carboxylic acids, for instance adipic acid, dodecane dicarboxylic acid, isophthalic acid and terephthalic acid and trifunctional carboxylic acids, for instance 1,3,5-tris(caproic acid)melamine, trimesic acid and trimeric fatty acids with 50–60 carbon atoms as well as esters and anhydrides of said carboxylic acids. Preferably, the difunctional carboxylic acid is terephthalic acid. Preferably, the trifunctional carboxylic acid is 1,3,5-tris(caproic acid)melamine (TCAM) or trimesic acid.

Eligible amines ($B_w$) are preferably difunctional amines, for instance diaminobutane, diaminohexane, diaminododecane, cyclic amines, for instance 1,4-diaminocyclohexane, 4,4'-diaminobicyclohexylamine, 1,3- and 1,4-xylylene diamine and trifunctional amines, for instance trisaminononane and bis (hexamethylene triamine). Preferably, the difunctional amine is 1,6-hexamethylene diamine. Preferably, the trifunctional amine is bis (hexamethylene triamine).

Besides the units derived from compounds I and II according to the invention also other units derived from carboxylic acids and amines may be present, for instance monofunctional carboxylic acids and amines (chain terminators).

Although the aim of the invention according to ZP-345.648-B1 is not the aim of the present invention, while said publication does not mention the measures according to the present invention, either, it does mention, besides a number of randomly branched polyamides that do not satisfy the measures according to the present invention, also a number of randomly branched polyamides which coincidentally satisfy the measures according to the invention. These randomly branched polyamides are excluded from the application, more specifically the randomly branched polyamides that are built up of units derived from carboxylic acids ($A_v$) having a functionality v and amines ($B_w$) having a functionality w, in the following amounts (in $\mu$mol/g of polyamide):

$B_1$ (20), $B_3$ (60) and $A_2$ (20)
$B_1$ (10), $B_3$ (60) and $A_2$ (30)
$B_1$ (120), $B_2$ (30) and $A_3$ (60)
$B_1$ (120), $B_2$ (30) and $A_3$ (70)
$B_1$ (170), $B_3$ (30), $A_2$ (60) and $A_3$ (60)

The intrinsically gel-free, randomly branched polyamide according to the invention can be produced using methods known to one skilled in the art, both via a batch process and via a continuous process According to a first embodiment all AB monomers, carboxylic acids and amines are polymerized in amounts according to the invention in a reactor at a suitable temperature and pressure According to a second embodiment the carboxylic acids and amines are added to a melt of a polyamide comprising units derived from AB monomers.

The gel-free, randomly branched polyamide according to the invention can also contain the customary additives, for instance flame retardants, fillers, release agents, lubricants and colourants.

The intrinsically gel-free, randomly branched polyamide according to the invention is eminently suitable for the production of fibre, film, foams and moulded articles. In particular, the intrinsically gel-free, randomly branched polyamide according to the invention is eminently suitable for the production of thin film, in particular flat film. The inventors have established that no gels could be observed in said thin film obtained with the polyamide according to the invention. Another surprising advantage of the polyamide according to the invention is that no or hardly any neck-in occurs in the production of flat film. Neck-in is the decrease in the ratio of film width to die width during the film forming process. This surprising advantage allows films to be formed in a simple manner without the known attendant measures to prevent neck-in, for instance cooling of the film edges during the film forming process.

The invention therefore also relates to a process for the production of film obtained from the polyamide according to the invention, as well as to the film obtained with the polyamide according to the invention.

The invention will now be elucidated on the basis of examples, without however being limited thereto.

EXAMPLES

Examples I–VIII

Graphical Development of the Gel-Free Concentration Range

Figure 1:
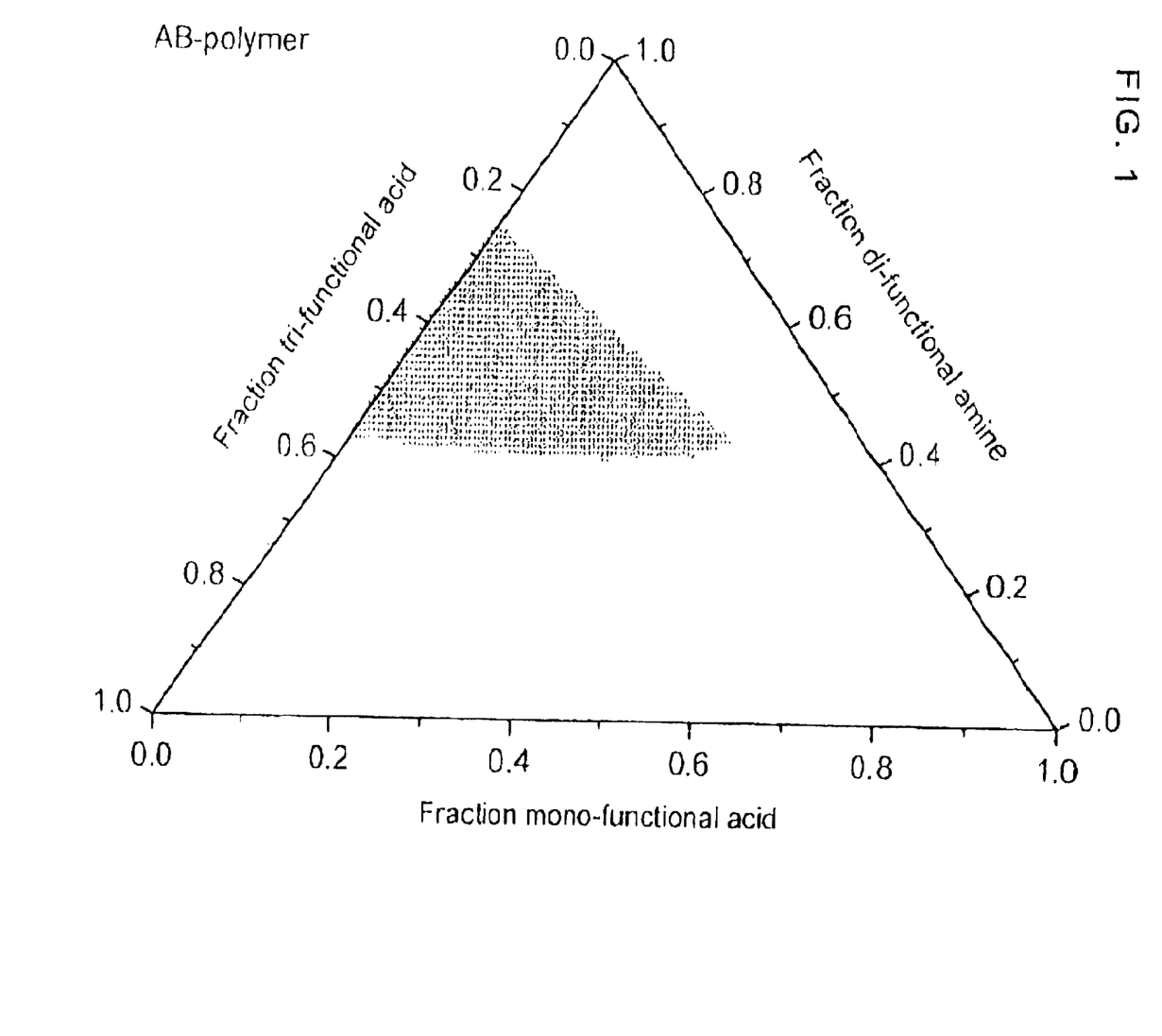
Figure 2:
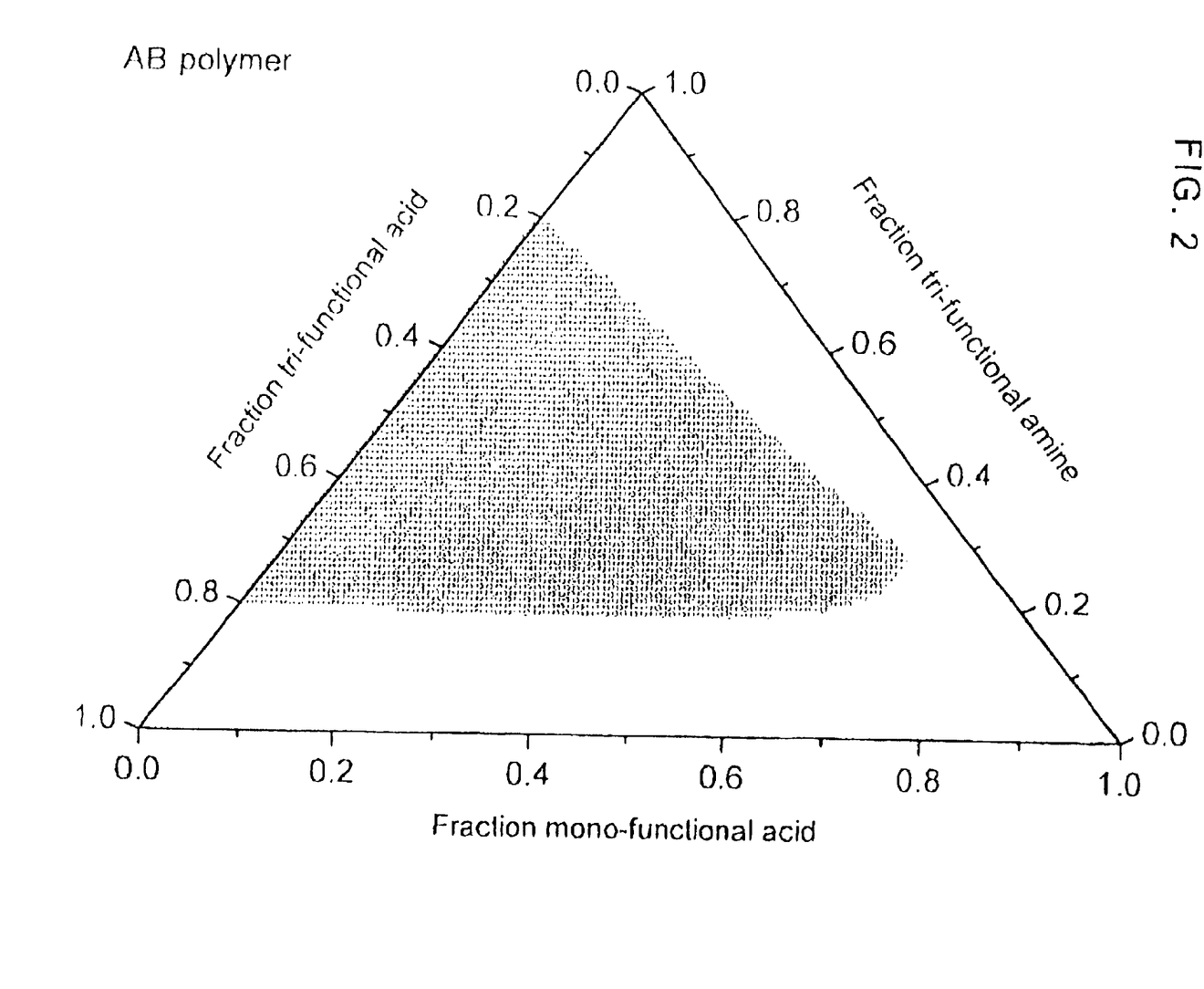
Figure 3:
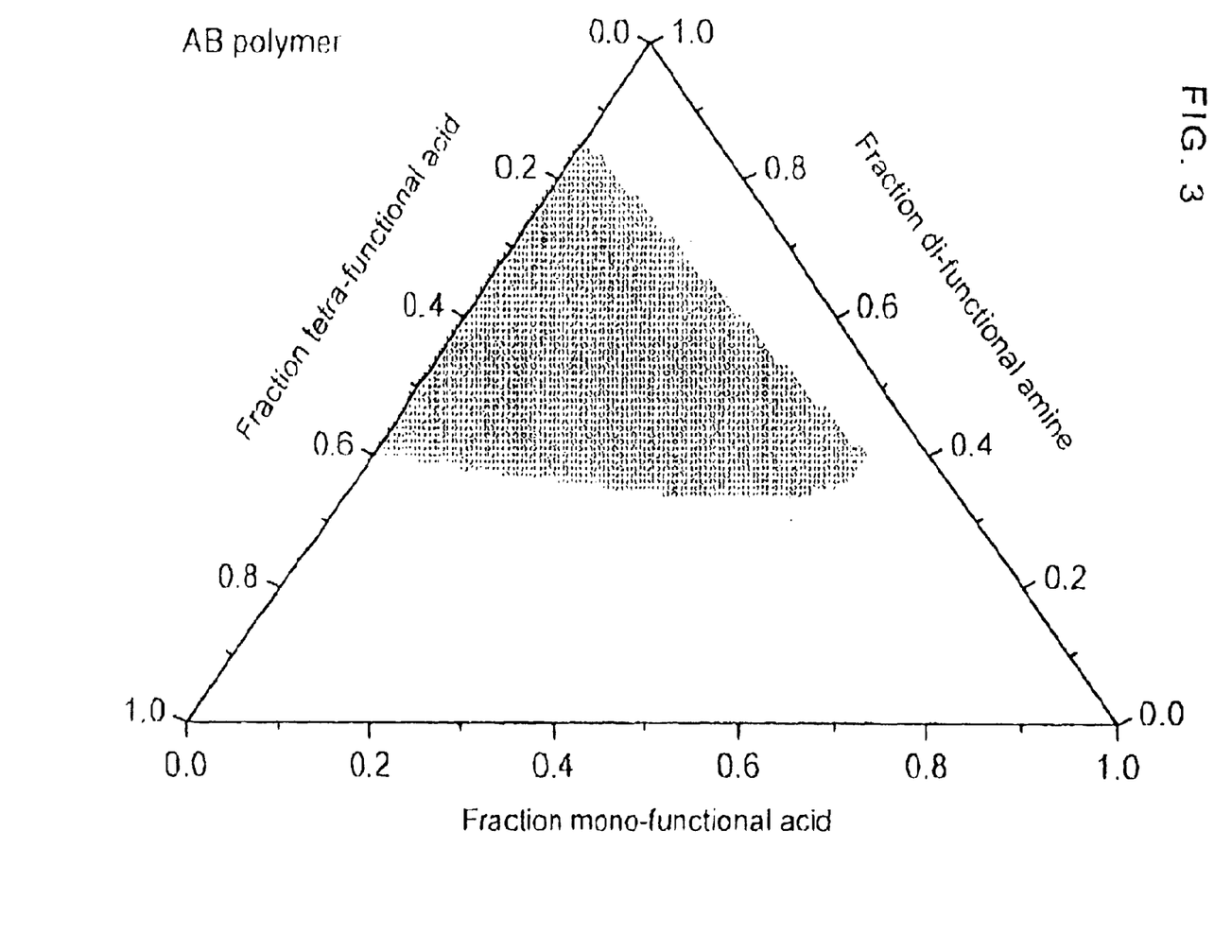
Figure 4:
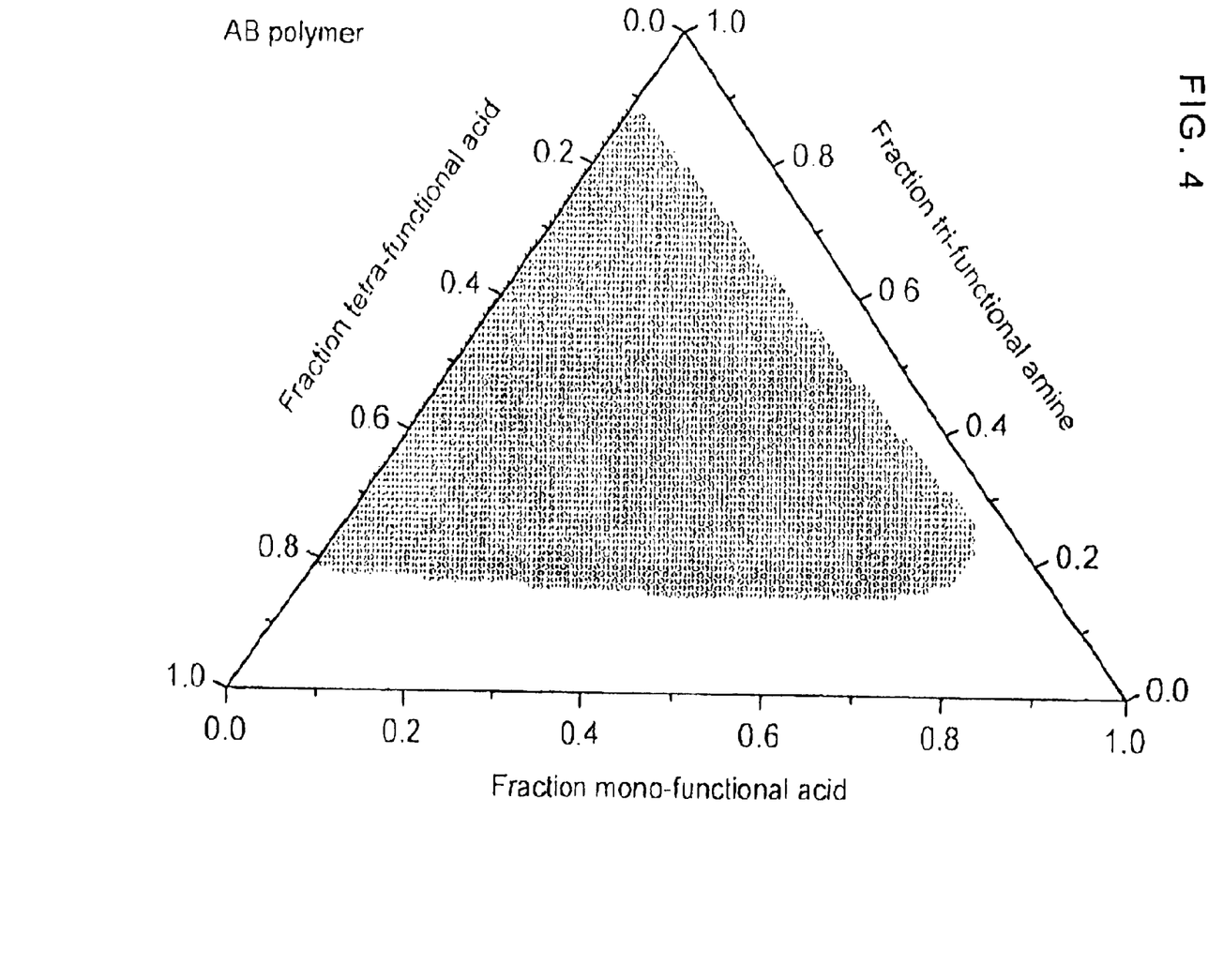
Figure 5:
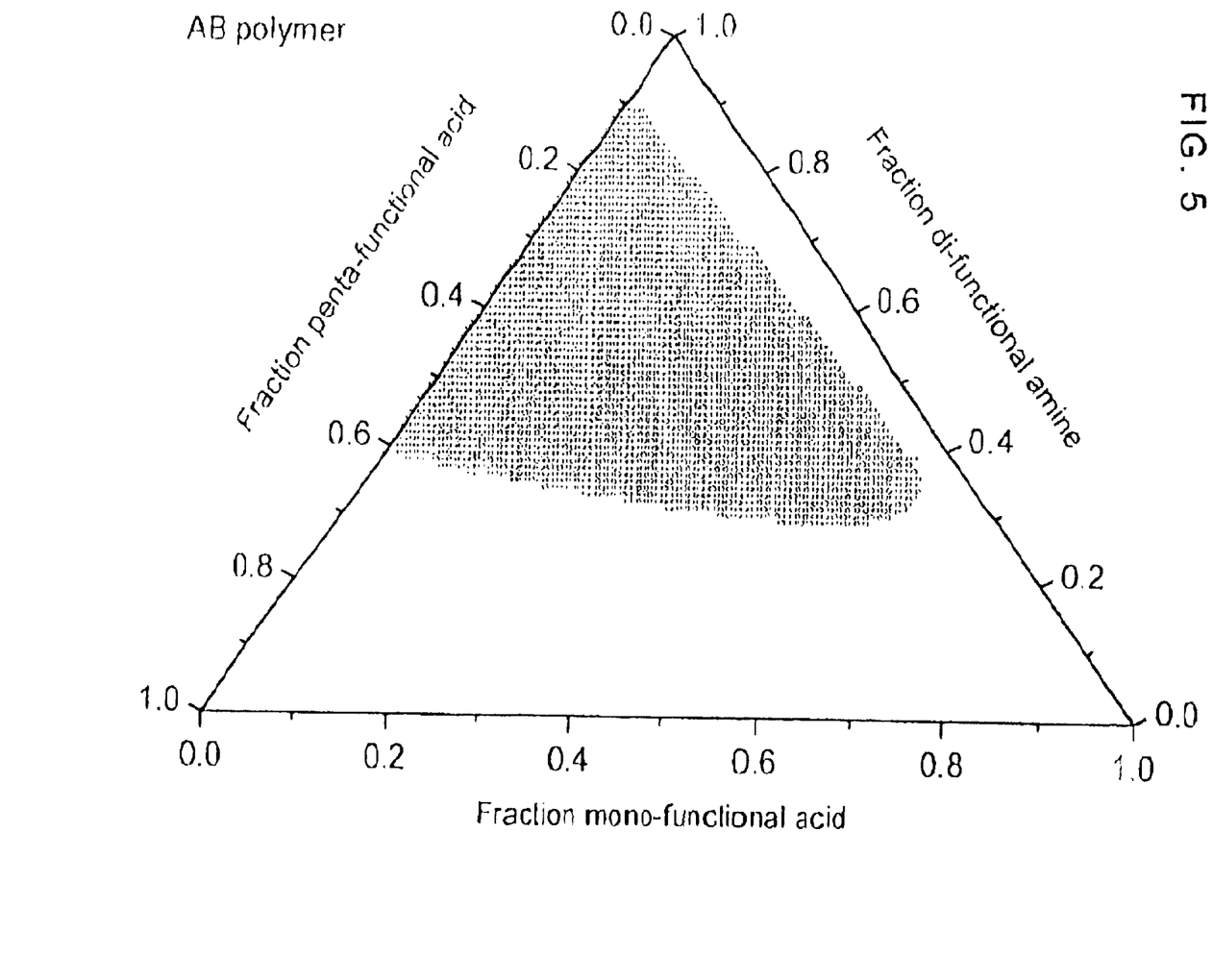
Figure 6:
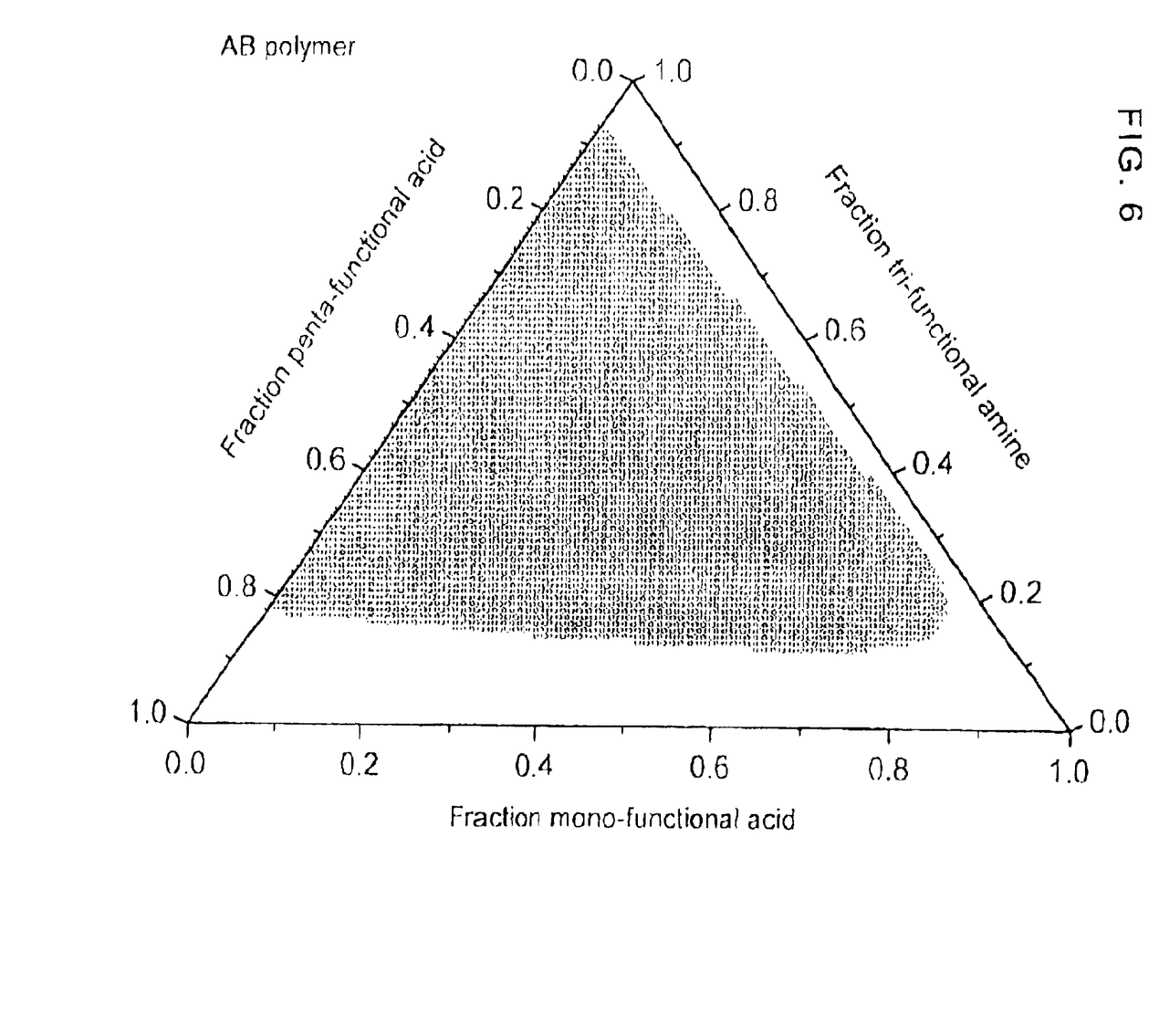
Figure 7:
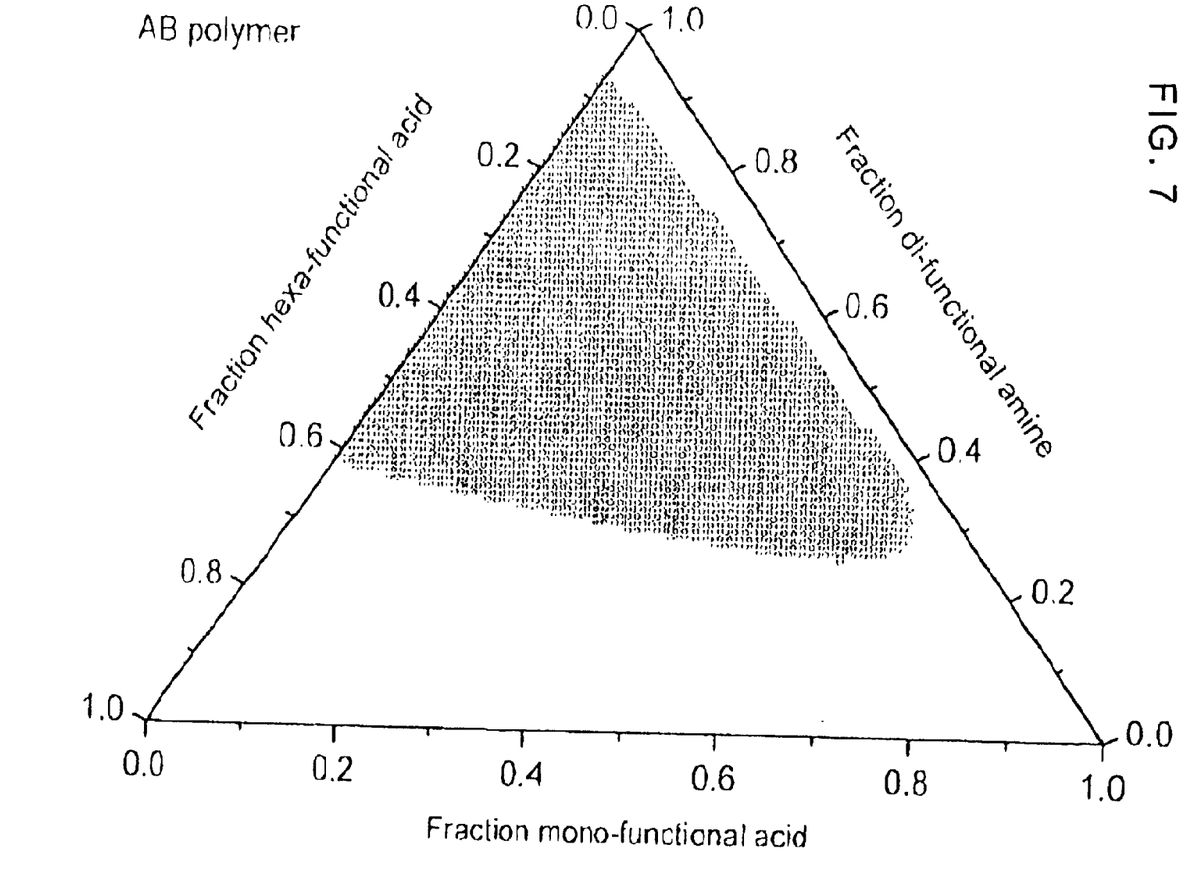
Figure 8:
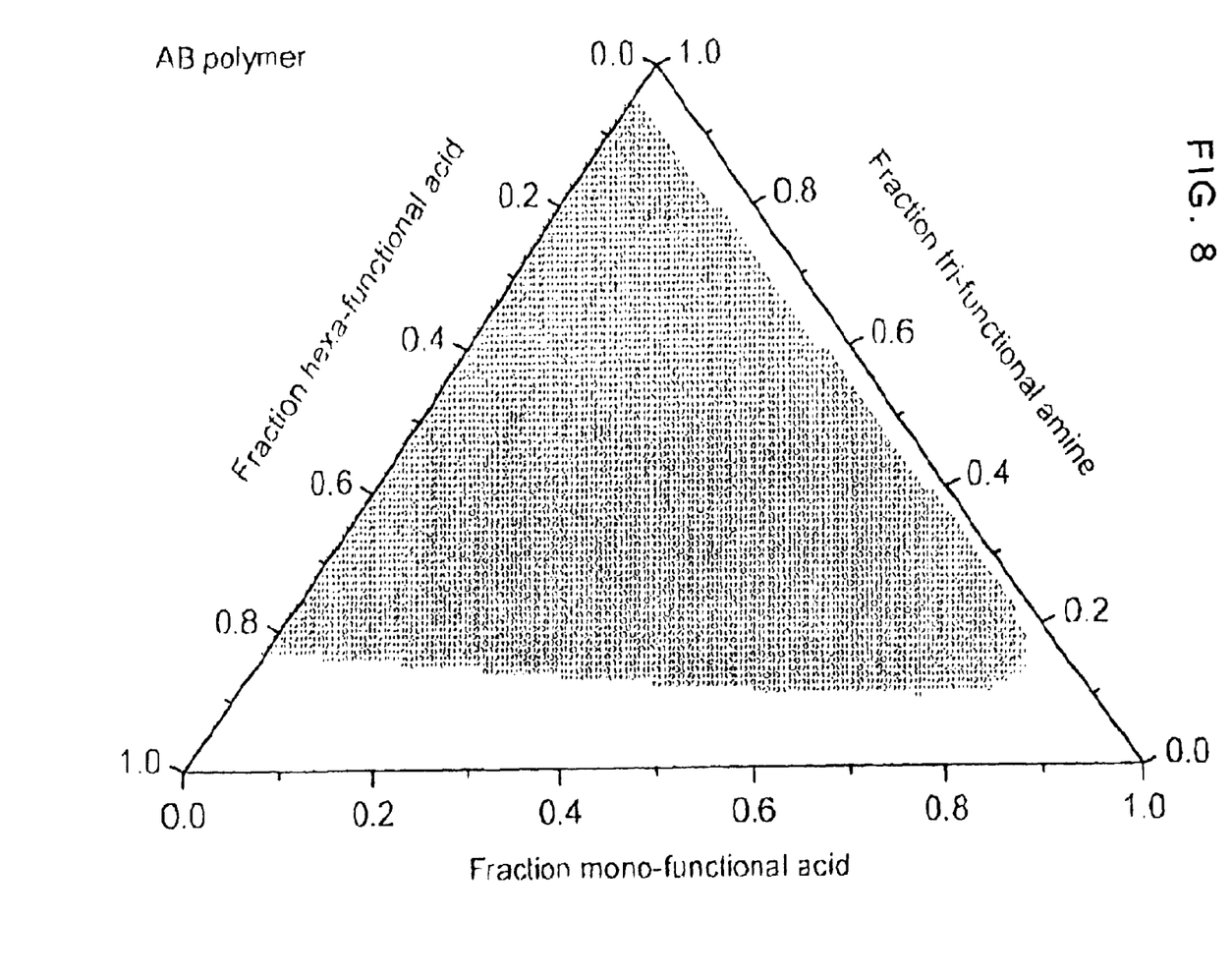

For a number of combinations of carboxylic acids and amines (Table 1), formulas (1)–(2) were developed into a graphical representation for a combination of three carboxylic acids or amines (FIGS. 1–8), without however limiting the invention to the examples given. In the figures it was shown what amounts (expressed as mole fractions) of units derived from carboxylic acids and amines an intrinsically gel-free, randomly branched polyamide can contain. In the concentration range indicated by small circles the randomly branched polyamide is non-intrinsically gel-free. It is remarkable to note that the intrinsically gel-free nature of a randomly branched polyamide does not depend on the absolute amount of units derived from a carboxylic acid or amine, but only on the relative ratio of the units derived from the carboxylic acids and amines. This also means that the intrinsically gel-free nature of a randomly branched polyamide according to the invention does not depend on the amount of units derived from AB monomers. A third remarkable fact is that in the polyamide according to the invention all units derived from carboxylic acids can be replaced by amines, and the other way round, without this changing the gel-free nature of a polyamide. For instance, the concentration range for the units derived from carboxylic acids $A_1$ and $A_3$ and the amine $B_2$ is the same as that for units derived from amines $B_1$ and $B_3$ and the carboxylic acid $A_2$ (FIG. 1).

TABLE 1

Combinations of carboxylic acids and amines

| Example | Carboxylic acid | Amines | Figure |
| --- | --- | --- | --- |
| I | $A_1, A_3$ | $B_2$ | 1 |
| II | $A_1, A_3$ | $B_3$ | 2 |
| III | $A_1, A_4$ | $B_2$ | 3 |
| IV | $A_1, A_4$ | $B_3$ | 4 |
| V | $A_1, A_5$ | $B_2$ | 5 |
| VI | $A_1, A_5$ | $B_3$ | 6 |
| VII | $A_1, A_6$ | $B_2$ | 7 |
| VIII | $A_1, A_6$ | $B_3$ | 8 |

Preparation of Gel-Free, Randomly Branched Polyamides

Process 1

100 g of $\epsilon$-caprolactam, 1 g of $\epsilon$-aminocaproic acid, 2 g of water and varying amounts of carboxylic acids and amine (see Table 2 for the molar ratios) were mixed in a glass tube at 90° C. The tube was equipped with a reflux cooler and was purged three times with vacuum/nitrogen before use, following which the reaction mixture was heated to 260–270°

C. in a nitrogen atmosphere and was subsequently kept at this temperature for 11 hours. After cooling, the tube was broken and its contents ground and washed three times in boiling water so as to remove any unreacted caprolactam and low-molecular oligomers and subsequently dried for 24 hours in a vacuum at 80° C. The polymer obtained was white. The washed and dried polymers were subjected to a number of analyses such as melt viscosity and intrinsic viscosity The melt viscosity was determined using a Rheometrix 800 plate/plate apparatus as so-called zero viscosity at 230° C., in other words the dynamic melt viscosity at zero shear force. The intrinsic viscosity was determined by means of a three-point measurement (3, 4 and 5 g/l) in 858 formic acid at 25° C. All polymers In Table 1 were prepared in this way.

Process 2

In a 5-liter reactor 3.5 kg of ε-caprolactam, 35 g of ε-aminocaproic acid, 70 g of water and the varying amounts of additives were combined. The temperature of the reaction mixture was kept at 90° C. for 5 hours, after which the mixture was heated to 275° C. in about 2 hours and was kept at that temperature for 5 hours. Subsequently, the temperature was lowered to 240° C. in 60 minutes and kept at that value for 3.5 hours. Next, the reactor contents were drained in a nitrogen atmosphere at 1 bar overpressure. The polymer thread flowing out the reactor was cooled in ice water and chopped into granules, which were washed with water at 100° C. and subsequently dried.

Post-Condensation

The polymer obtained by means of processes 1 and 2 was post-condensed for 10 hours at 190° C. in a vacuum and with a nitrogen leak.

Examples IX–XXXII

Process 1 was used to prepare a number of polyamides, the compositions being given in Table 2. In none of the polyamides was crosslinking observed during or after the polymerization.

TABLE 2

Intrinsically gel-free polyamide compositions (amounts in moles).

| Ex. | $A_1$ | $B_1$ | $A_2$ | $B_2$ | $A_3$ | $B_3$ | AB monomer |
|---|---|---|---|---|---|---|---|
| IX | 1 | — | — | 0.25 | 0.25 | — | 300 |
| X | 1 | — | — | 0.5 | 0.5 | — | 300 |
| XI | 1 | — | — | 0.75 | 0.75 | — | 300 |
| XII | 1 | — | — | 1 | 1 | — | 300 |
| XIII | 1 | — | — | 2 | 2 | — | 300 |
| XIV | — | 1 | 0.25 | — | — | 0.25 | 300 |
| XV | — | 1 | 0.5 | — | — | 0.5 | 300 |
| XVI | — | 1 | 1 | — | — | 1 | 300 |
| XVII | — | 1 | 2 | — | — | 2 | 300 |
| XVIII | 1 | 1.25 | — | 0.25 | 0.25 | — | 300 |
| XIX | 1 | 1.5 | — | 0.5 | 0.5 | — | 300 |
| XX | 1 | 2 | — | 1 | 1 | — | 300 |
| XXI | 1 | 3 | — | 2 | 2 | — | 300 |
| XXII | 1 | 1.5 | — | 0.5 | 0.5 | — | 300 |
| XXIII | 0.5 | — | — | — | 0.5 | — | 300 |
| XXIV | 0.33 | — | — | 0.67 | 1.33 | — | 300 |
| XXV | 0.5 | — | — | 0.5 | 1 | — | 300 |
| XXVI | 0.6 | — | — | 0.4 | 0.8 | — | 300 |
| XXVII | 0.67 | — | — | 0.33 | 0.67 | — | 300 |
| XXVIII | 2 | — | — | 2 | 1 | — | 300 |
| XXIX | 0.67 | — | — | 0.67 | 1 | — | 300 |
| XXX | 0.5 | — | — | 0.5 | 1 | — | 300 |
| XXXI | 0.57 | — | — | 0.29 | 0.57 | — | 300 |
| XXXII | 1.33 | — | — | 1.67 | 1.33 | — | 300 |

TABLE 2-continued

Intrinsically gel-free polyamide compositions (amounts in moles).

| Ex. | $A_1$ | $B_1$ | $A_2$ | $B_2$ | $A_3$ | $B_3$ | AB monomer |
|---|---|---|---|---|---|---|---|

Explanation of the Abbreviations:
$A_1$: benzoic acid
$B_1$: hexylamine
$A_2$: adipic acid
$B_2$: hexamethylene diamine
$A_3$: 1,3,5-tris(caproic acid)melamine
$B_3$: bis(hexamethylene)triamine
AB monomer: ε-caprolactam COMPARATIVE EXAMPLES A–G According to EP-B1-345.638

Process 1 was used to prepare a number of polyamides, their compositions being given in Table 3 In all polyamides crosslinking was observed during or after the polymerization.

TABLE 3

Comparative examples according to EP-B1-345.638.

| Comparative example | Example acc. to HP-B1-345.638 (Table 2) | AB monomer | $B_1$ (L-252) | $B_3$ (N-TEA) | $A_2$ (ADS) | $A_3$ (TMS) | gel formation |
|---|---|---|---|---|---|---|---|
| A | 10 | amino-laurine acid | 180 | 30 | — | 90 | yes |
| B | 11 | amino-laurine acid | 190 | 30 | — | — | yes |
| C | 13 | amino-laurine acid | 176 | 28 | 46 | 56 | yes |
| D | 15 | caprolactam | 210 | 30 | — | 100 | yes |
| E | 16 | caprolactam | 210 | 30 | — | 100 | yes |
| F | 17 | caprolactam | 176 | 28 | 46 | 56 | yes |
| G | 18 | caprolactam | 124 | 20 | 32 | 40 | yes |

Figure 9:
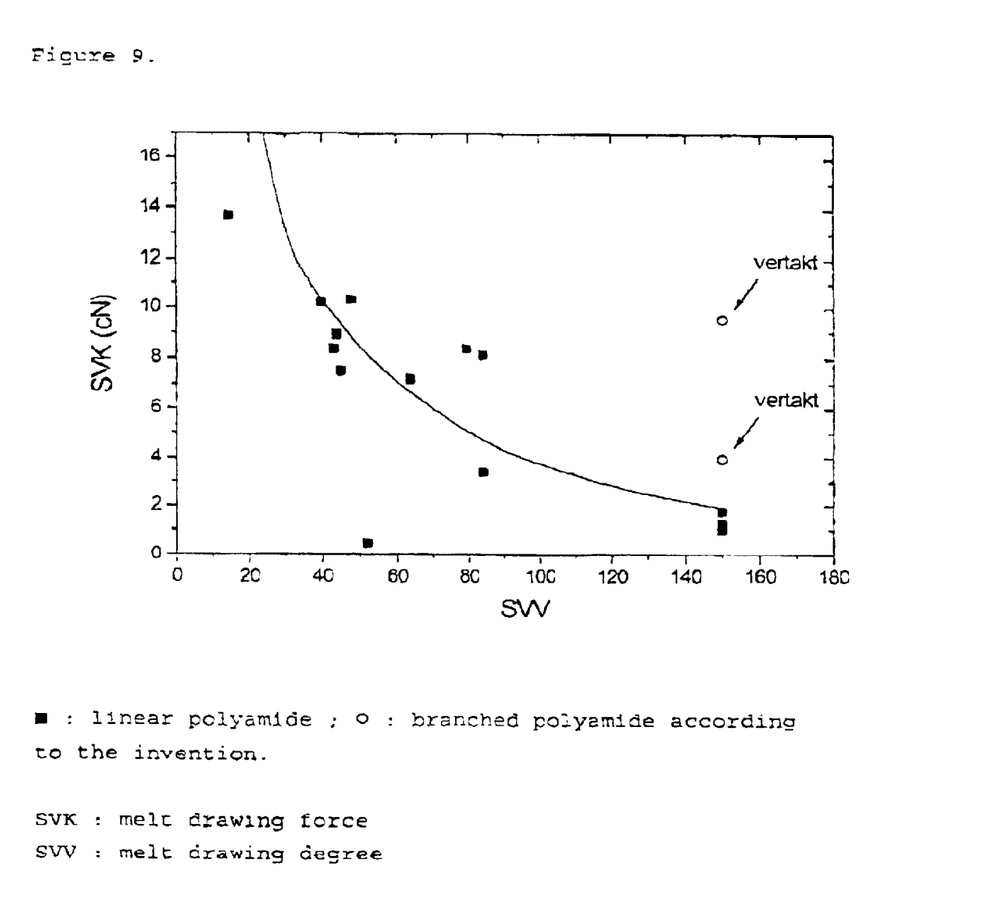

Explanation of the Abbreviations
L-252: 3-amino-1-cyclohexyl-aminopropane
N-TEA: nitrilotriethane amine
ADS: adipic acid
TMS: trimesic acid Mechanical Properties of the Polyamide According to the Invention Surprisingly, it was also found that the polyamide according to the invention combines a high melt strength with a high melt drawing degree compared to non-branched polyamide. This is shown in FIG. 9.

What is claimed is:

1. An intrinsically gel-free, randomly branched polyamide comprising at least units derived from:
   1. AB monomers, which monomers have both a carboxylic group (A) and an amine group (B),
   2. at least one compound I, being a carboxylic acid ($A_v$) or an amine ($B_w$), said at least one compound having a functionality w or v is 2 or 3,
   3. at least one compound II, being a carboxylic acid ($A_v$) or an amine ($B_w$) having a functionality w or v equal to 3, compound II being a carboxylic acid if compound I is an amine or compound II being an amine if compound I is a carboxylic acid; wherein
  a) the molar ratio of compound II to compound 1 is less than 1 where compound I is bifunctional;
  b) the molar ratio of compound II to compound I is less than 2 when compound I is trifunctional;
  c) the amounts of units derived from all carboxylic acids and amines in the polyamide satisfy formula $$P<1[(F_A-1)(F_B-1)] \quad (1)$$

where $$P=[\Sigma(n_i f_i)]_X/[\Sigma(n_i f_i)]_Y \quad (2)$$

where $P \leq 1$ and either X=A and Y=B, or X=B and Y=A, and $$F_x=\Sigma(n_i f_i^2)/\Sigma(n_i f_i)] \quad (3)$$

for, respectively, all carboxylic acids (X=A) and all amines (X=B), where $f_i$ is the functionality of either the carboxylic acid ($f_i=v_i$) or amine ($f_i=w_i$), $n_i$ being the number of moles of the carboxylic acid or amine and the summation involving all units derived from carboxylic acids and amines in the polyamide.

2. The polyamide according to claim 1, wherein the functionality of compound I is 2.

3. The polyamide according to claim 2, wherein at least a unit derived from monofunctional carboxylic acid or amine is present.

4. The polyamide according to claim 2, wherein compound I is terephthalic acid or 1,6-hexa-methylene diamine.

5. The polyamide according to claim 2, wherein compound II is 1,3,5-tris (caproic acid)-melamine, trimesic acid or bis (hexamethylene triamine).

6. The polyamide according to claim 1 wherein the AB monomer is an α, ω-amino acid and/or a lactam.

7. The polyamide according to claim 6, wherein the lactam is δ-caprolactam.

8. A process for the preparation of a polyamide film comprising forming a film from a polyamide according to claim 1.

9. A fiber, film, foam or molded article formed from polyamide according to claim 1.

10. A film formed from a polyamide according to claim 1.

11. A process for preparing intrinsically gel-free, randomly branched polyamides comprising:
  A. selecting:
    i) at least one AB monomer having both a carboxylic group (A) and an amine group (B);
    ii) at least one compound I, being a carboxylic acid ($A_v$) having a functionality $v \geq 2$ or an amine ($B_w$) having a functionality $w \geq 2$;
    iii) at least one compound II, being a carboxylic acid ($A_v$) having a functionality $v \geq 3$ or an amine ($B_w$) having a functionality $w \geq 3$ compound II being a carboxylic acid if compound I is an amine or compound II being an amine if compound I is a carboxylic acid;
  B. determining the ratio of units derived from all carboxylic acids and amines in the polyamide using the following formula $$P<1[(F_A-1)(F_B-1)] \quad (1)$$

where $$P=[\Sigma(n_i f_i)]_X/[\Sigma(n_i f_i)]_Y \quad (2)$$

where $P \leq 1$ and either X=A and Y=B, or X=B and Y=A, and $$F_x=\Sigma(n_i f_i^2)/\Sigma(n_i f_i)] \quad (3)$$

for, respectively, all carboxylic acids (X=A) and all amines (X=B), where $f_i$ is the functionality of either the carboxylic acid ($f_i=v_i$) or amine ($f_i=w_i$), $n_i$ being the number of moles of the carboxylic acid or amine and the summation involving all units derived from carboxylic acids and amines in the polyamide; and
  C. polymerizing said at least one AB monomer, said at least one compound I and said at least one compound II in the ratio determined by step B to form an intrinsically gel-free polymer.

12. The process of claim 1, wherein
  a) the ratio of compound II to compound I is less than 1 where compound II is trifunctional and compound I is bifunctional; or
  b) the ratio of compound II to compound I is less than 2 when both compound I and compound II are trifunctional.

13. The process of claim 11 wherein the process is continuous.

14. The process of claim 12 wherein the process is continuous.

15. A process for preparing intrinsically gel-free, randomly branched polyamides comprising:
  A. selecting:
    i) at least one AB monomer having both a carboxylic group (A) and an amine group (B);
    ii) at least one compound I, being a carboxylic acid ($A_v$) having a functionality $v \geq 2$ or an amine ($B_w$) having a functionality $w \geq 2$;
    iii) at least one compound II, being a carboxylic acid ($A_v$) having a functionality $v \geq 3$ or an amine ($B_w$) having a functionality $w \geq 3$, compound II being a carboxylic acid if compound I is an amine or compound II being an amine if compound I is carboxylic acid; and
    iv) at least one compound III, being a monofunctional carboxylic acid or a monofunctional amine;
  B. determining the ratio of units derived from all carboxylic acids and amines in the polyamide using the following formula $$P<1[(F_A-1)(F_B-1)] \quad (1)$$

where $$P=[\Sigma(n_i f_i)]_X/[\Sigma(n_i f_i)]_Y \quad (2)$$

where $P \leq 1$ and either X=A and Y=B, or X=B and Y=A, and $$F_x=\Sigma(n_i f_i^2)/\Sigma(n_i f_i)] \quad (3)$$

for, respectively, all carboxylic acids (X=A) and all amines (X=B), where $f_i$ is the functionality of either the carboxylic acid ($f_i=v_i$) or amine ($f_i=w_i$), $n_i$ being the number of moles of the carboxylic acid or amine and the summation involving all units derived from carboxylic acids and amines in the polyamide; and
  C. polymerizing said at least one AB monomer, said at least one compound I, said at least one compound II, and said at least one compound III to form an intrinsically gel-free randomly branched polyamide.

16. The process of claim 15, wherein
  a) the ratio of compound II to compound I is less than 1 where compound II is trifunctional and compound I is bifunctional;

b) the ratio of compound II to compound I is less than 2 when both compound I and compound II are trifunctional.

17. The process of claim 15 wherein the process is continuous.

18. The process of claim 16 wherein the process is continuous.

19. Intrinsically gel-free, randomly branched polyamide comprising at least units derived from:

AR monomers, which monomers have both a carboxylic group (A) and an amine group (B);

at least one compound I, being a carboxylic acid ($A_v$) having a functionality $v \geq 2$ or an amine ($B_w$) having a functionality $w \geq 2$;

at least one compound II, being a carboxylic acid ($A_v$) having a functionality $v \geq 3$ or an amine ($B_w$) having a functionality $w \geq 3$, compound II being a carboxylic acid if compound I is an amine or compound II being an amine if compound I is a carboxylic acid, wherein at least one of compounds I and II comprises a carboxylic acid ($A_v$) or an amine ($B_w$) having a functionality v or w chosen from 4, 5, or 6 and the amounts of units derived from all carboxylic acids and amines in the polyamide satisfy the following formula:

$$P < 1[(F_A - 1)(F_B - 1)] \quad (1)$$

where:

$$P = [\Sigma(n_i f_i)]_X / [\Sigma(n_i f_i)]_Y \quad (2)$$

where $P \leq 1$ and either X=A and Y=B, or X=B and Y=A, and $$F_x = \Sigma(n_i f_i^2) / \Sigma(n_i f_i)] \quad (3)$$

for, respectively, all carboxylic acids (X=A) and all amines (X=B), where $f_i$ is the functionality of either the carboxylic acid ($f_i = v_i$) or amine ($f_i = w_i$), $n_i$ being the number of moles of the carboxylic acid or amine and the summation involving all units derived from carboxylic acids and amines in the polyamide.

20. Intrinsically gel-free, randomly branched polyamide comprising at least units derived from:

AB monomers, which monomers have both a carboxylic group (A) and an amine group (B);

at least one compound I, being a carboxylic acid ($A_v$) having a functionality $v \geq 2$ or an amine ($B_w$) having a functionality $w \geq 2$;

at least one compound II, being a carboxylic acid ($A_v$) having a functionality $v \geq 3$ or an amine ($B_w$) having a functionality $w \geq 3$, compound II being a carboxylic acid if compound I is an amine or compound II being an amine if compound I is a carboxylic acid;

optionally, at least one compound III, being a monofunctional carboxylic acid or a monofunctional amine;

wherein at least one of compounds I and II comprises a carboxylic acid ($A_v$) or an amine ($B_w$) having a functionality v or w chosen from 4, 5, or 6.

21. The polyamide of claim 20, wherein said compound I is difunctional, and compound II is tetrafunctional and the ratio of all carboxylic acids.

22. The polyamide of claim 20, wherein said compound I is trifunctional, and compound II is tetrafunctional and the ratio of all carboxylic acids.

23. The polyamide of claim 20, wherein said compound I is difunctional, and compound II is pentafunctional and the ratio of all carboxylic acids.

24. The polyamide of claim 20, wherein said compound I is trifunctional, and compound II is pentafunctional and the ratio of all carboxylic acids.

25. The polyamide of claim 20, wherein said compound I is difunctional, and compound II is hexafunctional and the ratio of all carboxylic acids.

26. The polyamide of claim 20, wherein said compound I is trifunctional, and compound II is hexafunctional and the ratio of all carboxylic acids.

* * * * *